United States Patent
Satarasinghe

(10) Patent No.: US 6,360,094 B1
(45) Date of Patent: Mar. 19, 2002

(54) METHOD FOR LOCATING ANTENNA PROBLEMS IN A CELLULAR COMMUNICATIONS NETWORK

(75) Inventor: Prasanna Jayaraj Satarasinghe, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/217,167

(22) Filed: Dec. 21, 1998

(51) Int. Cl.[7] .................................................. H04Q 7/34
(52) U.S. Cl. ........................ 455/423; 455/448; 455/562
(58) Field of Search ................................. 455/423, 422, 455/447, 448, 449, 452, 561, 562

(56) References Cited

U.S. PATENT DOCUMENTS

| | | | | |
|---|---|---|---|---|
| 4,888,596 A | * | 12/1989 | Cocanan | 343/703 |
| 5,423,072 A | * | 6/1995 | Iwashita et al. | 455/67.4 |
| 5,491,833 A | * | 2/1996 | Hamabe | 455/33.1 |
| 5,596,570 A | * | 1/1997 | Soliman | 370/252 |
| 5,914,946 A | * | 6/1999 | Avidor et al. | 370/336 |
| 5,974,320 A | * | 10/1999 | Ward et al. | 455/437 |
| 5,991,630 A | * | 11/1999 | Charas et al. | 455/452 |
| 6,031,498 A | * | 2/2000 | Issler | 343/703 |
| 6,070,090 A | * | 5/2000 | Feuerstein | 455/561 |
| 6,128,474 A | * | 10/2000 | Kim et al. | 455/67.1 |
| 6,216,244 B1 | * | 4/2001 | Myers et al. | 455/562 |

OTHER PUBLICATIONS

U.S. application No. 08/767,682, filed Dec. 17, 1996, Method for Hard Handoff in a CDMA Cellular Environment, Satarasinghe, Abstract and 7 sheets of drawings.

U.S. application No. 08/890,227, filed Jul. 9, 1997, Method and System for Increasing Capacity and Improving Performance of a Cellular Network, Satarasinghe, Abstract and 2 sheets of drawings.

* cited by examiner

*Primary Examiner*—Daniel Hunter
*Assistant Examiner*—Thuan T. Nguyen
(74) *Attorney, Agent, or Firm*—Haynes and Boone, LLP

(57) ABSTRACT

Method and apparatus for creating and using a database containing automated measurements to pin point cell sites and sectors with antenna-related problems are disclosed. Each base station in a wireless communications network is equipped with a site test mobile ("STM") connected to the antenna(s) for the cell site. A database contains information regarding the location (latitude and longitude) of every cell site, or base station, and the design type, orientation, patterns (vertical and horizontal), and gain for every antenna in the network by sector. Automated measurements of various transmission parameters are periodically taken using the respective STMs and compared with calibration data stored in the database to determine the location and type of antenna problems that exist in the network.

12 Claims, 2 Drawing Sheets

METHOD FOR LOCATING ANTENNA PROBLEMS IN A CELLULAR COMMUNICATIONS NETWORK

TECHNICAL FIELD

The invention relates generally to wireless communications networks and, more particularly, to a method for locating antenna problems in a wireless communications network.

BACKGROUND OF THE INVENTION

The performance of various radio frequency ("RF") links in a wireless communications network is a critical differentiator in providing a competitive advantage; therefore, it is very important to be able quickly and efficiently to identify factors that contribute to poor RF link performance.

Certain performance problems can be identified using operational and maintenance statistics taken from measurements that the network takes periodically to isolate equipment-related problems. Once a problem is isolated to a particular location, a network engineer or technician is sent out to manually collect additional data in the identified area using, for example, a test vehicle equipped with the necessary equipment. Subsequently, the collected data must be analyzed to isolate specific problems. In most cases, this involves physically doing measurements to identify the antenna problem.

In terms of optimizing both analog and digital wireless communications networks, it is well known that antenna-related issues are a significant contributor to performance degradation. Two major antenna problems, i.e., bad antennas and incorrectly-oriented antennas, are not generally identifiable by visual inspection. Bad receive ("Rx") antennas are especially difficult to locate. Given the cost and resource involvement in optimization, significant cost and resource savings could be realized if antenna-related network performance problems could be easily identified. Clearly, at present it is difficult and costly to identify and isolate antenna-related problems in a wireless communications network.

In view of the foregoing, what is needed are a method and apparatus for locating antenna-related problems in a wireless communications network in a timely, efficient and cost-effective manner so that the problems can be corrected before they are too serious.

SUMMARY OF THE INVENTION

One embodiment of the invention, accordingly, is a method and apparatus for pinpointing cell sites and sectors with antenna-related problems are disclosed. Each base station in a wireless communications network is equipped with a site test mobile ("STM") connected to the antenna(s) for the cell site. A database contains information regarding the location (latitude and longitude) of every cell site, or base station, and the design type, orientation, patterns (vertical and horizontal), and gain for every antenna in the network by sector. Automated measurements of various transmission parameters are periodically taken using the respective STMs and compared with calibration data stored in the database to determine the location and type of antenna problems that exist in the network.

A technical advantage achieved with the invention is that it is much more cost- and resource-effective than current methods of locating antenna-related problems in a wireless communications network.

Another technical advantage achieved with the invention is that it is capable of tracking trends, which information is useful in preventing future problems.

DESCRIPTION OF THE PREFERRED EMBODIMENT

Figure 1:
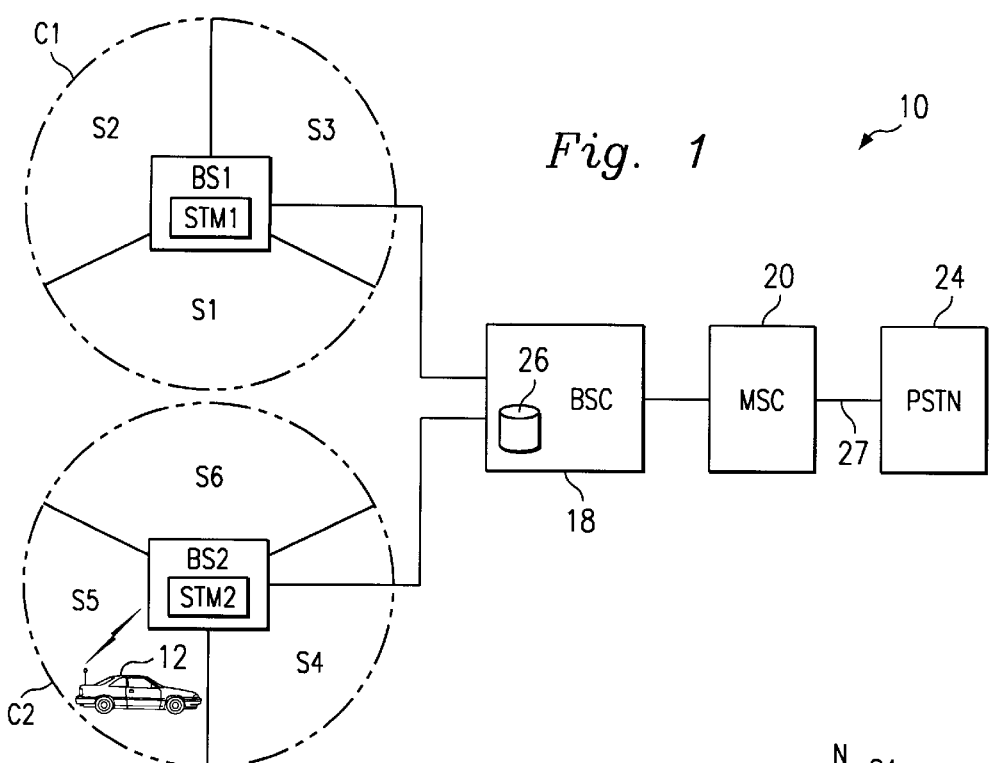
FIG. 1 is a system block diagram of a cellular wireless communications network embodying features of the present invention.

FIG. 1 is a system block diagram of a cellular wireless communications network 10 embodying features of the present invention. As shown in FIG. 1, the network 10 comprises a plurality of cell sites, represented in FIG. 1 by cell sites C1 and C2, each of which may be subdivided into a plurality of sectors S1, S2, and S3, and S4, S5, and S6, respectively. Each cell site C1, C2, comprises a base station BS1, BS2, respectively, the primary function of which is to provide over-the-air RF communication with mobile units, such as a mobile unit 12. The base stations BS1, BS2, are further connected via a link to a base station controller ("BSC") 18, which is in turn connected to a mobile switching center ("MSC") 20. As will be described in greater detail with reference to FIGS. 2A and 2B, antennas for communicating with the mobile unit 12 are provided at each of the cell sites C1, C2. In particular, each sector S1–S6 has associated therewith at least two antennas, including one Tx/Rx duplexed antenna and one Rx only. Alternatively, there may be three antennas, including two Rx and one Tx. The antennas for each sector are represented in FIGS. 2A and 2B as a single antenna.

Additionally, in accordance with a feature of the present invention, each base station BS1, BS2, is equipped with a site test mobile STM1, STM2, respectively, for communicating with other base stations, as will be described. Each site test mobile STM1, STM2, is connected to the antennas located at the respective base station BS1, BS2, so that it is capable of measuring the signal transmitted at the antenna. The site test mobile at each cell site is common to all of the sectors of that cell site and can be switched between sectors. A database 26 is provided at the BSC 18 for purposes that will also be described in greater detail below.

The MSC 20 connects the entire network 10 to a public switched telephone network ("PSTN") 24 via a land line 27. As the individual components of the network 10, as well as the PSTN 24, are well known in the art, the details thereof will not be further described, except as necessary to impart a complete understanding of the present invention.

Figure 2A:
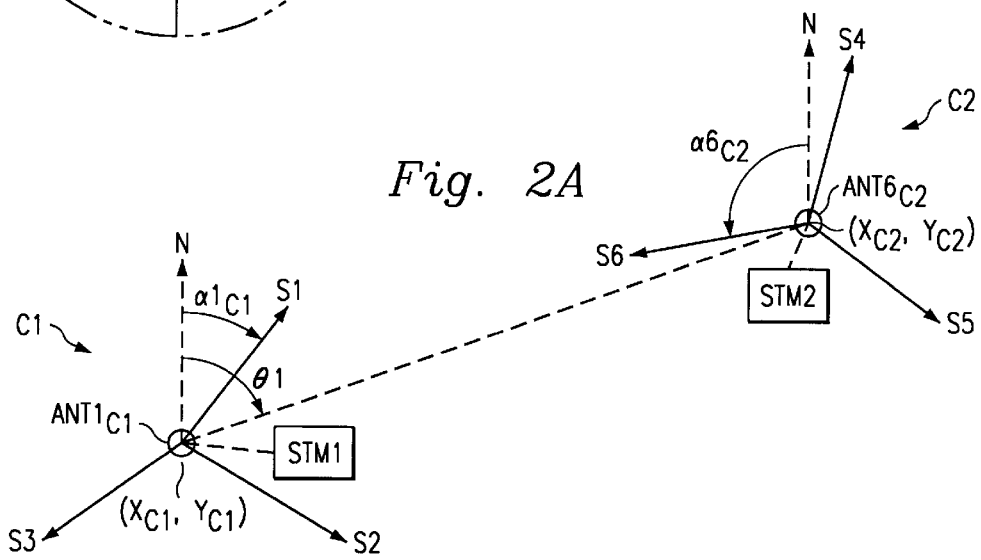
FIGS. 2A and 2B, respectively, are a plan view and an elevational view of a typical pair of cell sites of the network of FIG. 1.
Figure 2B:
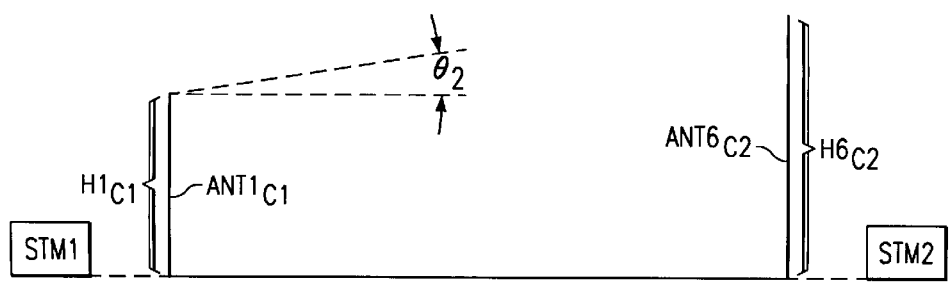

FIGS. 2A and 2B are a plan view and an elevation view, respectively, of the pair of adjacent cell sites C1 and C2. It will be recognized that for each of the cell sites C1, C2, the arrows designated S1–S6 represent the optimal or desired direction of the antenna for the respective cell site/sector, as described below. As shown in FIG. 2A, the cell site C1 is centered at coordinates $(x_{C1}, y_{C1})$ with a sector S1 antenna $Ant1_{C1}$ (FIG. 2B) directed toward the cell site C2 and having an orientation of angle $\alpha1_{C1}$ from true north N and a gain $G1_{C1}$. Similarly, cell site C2 is centered at coordinates $(x_{C2}, y_{C2})$ with a sector S6 antenna $Ant6_{C2}$ (FIG. 2B) directed toward the cell site C1 and having an orientation of angle $\alpha 6_{C2}$ and a gain $G6_{C2}$. It will be assumed, for the sake of example, that the antennas $Ant1_{C1}$ and $Ant6_{C2}$ have respective heights of $H1_{C1}$ and $H6_{C2}$, respectively, as best shown in FIG. 2B. Angles $\theta 1$ and $\theta 2$ (FIG. 2A) will be discussed in greater detail below.

An initial measurement is taken for a pair of sites, such as the sites C1 and C2, at the time of commissioning of the network, for new networks, or during a routine maintenance period for calibration purposes, for existing networks. Thereafter, measurements are automated and carried out during the network's least busy time, which is usually at night, for each pair of "neighbor" sectors, as determined by the database 26 entries for each site. Simultaneous measurements, with both cell sites transmitting and receiving at the same time, are taken from both sectors under consideration, to minimize variations due to unequal propagation conditions. Given below are the format of the cell site database 26 entries and the flowchart for the decision-making algorithm. There will be two tables maintained in the database 26 for every cell site. Table 1 will contain the calibration (i.e., fixed) information from the time of calibration and Table 2 will contain information updated real time, from automated measurements. The format of Table 2 is identical to that of Table 1, except that the information contained in Table 2 is changing real time. For example, the value $M1_{C1,Nn}$, gives the site test mobile STM1 measurement of cell site C1, sector S1, taken with a neighbor cell Nn transmit/receive (Tx/Rx) antenna. This involves one Rx antenna of cell site C1, sector S1, and a Tx/Rx (duplexed) antenna of a neighbor cell Nn, e.g., cell site C2, sector S6. As used herein, a "neighbor" is a cell site/sector combination that has an antenna that is optimally directed toward the antenna of the cell site/sector combination under consideration.

The aforementioned simultaneous measurement from the site test mobile STM2 of cell site C2, sector S6, will test the other Rx antenna of the cell site C2, sector S6, and the Tx/Rx (duplexed) antenna of cell site C1, sector S1. The azimuth and elevation antenna patterns will reference to a lookup table such as that shown in Table 1 below:

TABLE 1

EXAMPLE

| Cell Site No.: | C1 | | |
|---|---|---|---|
| Location: | $(x_{C1}, y_{C1})$ | | |
| | Sector S1 | Sector S2 | Sector S3 |
| Antenna Type: | $Ant1_{C1}$ | $Ant2_{C1}$ | $Ant3_{C1}$ |
| Pattern Elevation: | Table $E1_{C1}$ | Table $E2_{C1}$ | Table $E3_{C1}$ |
| Pattern Azimuth: | Table$A1_{C1}$ | Table$A2_{C1}$ | Table$A3_{C1}$ |
| Antenna Orientation: | $\alpha 1_{C1}$ | $\alpha 2_{C1}$ | $\alpha 3_{C1}$ |
| Antenna Height: | $H1_{C1}$ | $H2_{C1}$ | $H3_{C1}$ |
| Receive Antenna Gain: | $G1_{C1, Rx}$ | $G2_{C1, Rx}$ | $G3_{C1, Rx}$ |
| Effective Isotropic Radiated Power ("EIRP") (Transmit Antenna) (dB): | $P1_{C1, Tx}$ | $P2_{C1, Tx}$ | $P3_{C1, Tx}$ |
| Rx Antenna Path Loss (dB): | $L1_{C1}$ | $L2_{C1}$ | $L3_{C1}$ |
| N1: | $M1_{C1, N1}$ | $M2_{C1, N1}$ | $M3_{C1, N1}$ |
| N2: | $M1_{C1, N2}$ | $M2_{C1, N2}$ | $M3_{C1, N2}$ |
| . | . | . | . |
| . | . | . | . |
| . | . | . | . |
| Nn | $M1_{C1, Nn}$ | $M2_{C1, Nn}$ | $M3_{C1, Nn}$ |

Using the angle ($\theta 1 - \alpha 1_{C1}$) and the lookup value from the antenna $Ant1_{C1}$ azimuth table, the gain of the antenna $Ant1_{C1}$ azimuth pattern in the direction of the cell site C2 is determined. Similarly, the gain of the antenna $Ant1_{C1}$ elevation pattern in the direction of the cell site C2 is determined using $\theta 2$ and the lookup value from the antenna $Ant1_{C1}$ elevation table. $\theta 1$ and $\alpha 2$ for the pair cell site C1, sector S1, and cell site C2, sector S6, are given by:

$$\theta 1 = \tan^{-1}[(X_{C2} - X_{C1})/(Y_{C2} - Y_{C1})]$$

$$\theta 2 = \tan^{-1}[(H6_{C2} - H1_{C1})/[\{(Y_{C2} - Y_{C1})^2 + (X_{C2} - X_{C1})^2\}^{1/2}]]$$

The azimuth and elevation pattern gains for antenna $Ant6_{C2}$ can be determined in a similar manner. The lookup table gain values for both azimuth and elevation antenna patterns are normalized and the lookup table will provide the reduction from maximum gain for a specific angle.

Assuming for the sake of example that the azimuth and elevation gain reductions for the antenna $Ant1_{C1}$ are given by $GA1_{C1,Rx}$, $GE1_{C1,Rx}$, for the receive antenna and $GA1_{C1,Tx}$, $GE1_{C1,Tx}$, for the transmit antenna, that the azimuth and elevation gain reductions for the antenna $Ant6_{C2}$ are given by $GA6_{C2,Rx}$, $GE6_{C2,Rx}$, for the receive antenna and $GA6_{C2,Tx}$, $GE6_{C2,Tx}$, for the transmit antenna, and that the propagation conditions are the same during the simultaneous measurements between cell site C1, sector S1, and cell site C2, sector S6, and that the over-the-air path loss is $L_{OA}$ and that N1 for cell site C1, sector S1, is cell site C2, sector S6, and vice versa:

$$M1_{C1,N1} = \{P6_{C2,Tx} - (GA6_{C2,Tx} + GE6_{C2,Tx})\} - L_{OA} + \{G1_{C1,Rx} - (GA1_{C1,Rx} + GE1_{C1,Rx})\} - L1_{C1,Rx}$$

$$M6_{C2,N1} = \{P1_{C1,Tx} - (GA1_{C1,Tx} + GE1_{C1,Tx})\} - L_{OA} + \{G6_{C2,Rx} - (GA6_{C2,Rx} + GE6_{C2,Rx})\} - L6_{C2,Rx}$$

The above equations for real time measurements can be compared with calibration measurements to identify any antenna-related issues. The $Pi_{Cj,Tx}$ terms include the transmission (Tx) antenna gain ($Gi_{Cj,Tx}$) for that sector. Bad antennas will have bad gains ($Gi_{Cj,Tx}$, or $Pi_{Cj,Tx}$, for Tx antennas and $Gi_{Cj,Rx}$ for Rx antennas). Problems related to incorrect orientation will be associated with gain reduction terms for the respective antennas (i.e., $GAi_{Cj,Tx}$ and $GEi_{Cj,Tx}$ for Tx antennas and $GAi_{Cj,Tx}$ and $GEi_{Cj,Tx}$ for Receive antennas). For a given sector and its associated neighbors, gain reduction terms will be different due to different angles $\theta 1_i$ and $\theta 2_i$ for every sector. However, the gain term of sector i ($Gi_{Cj,Tx}$, $Gi_{Cj,Rx}$) will be the same for measurements associated with its neighbors.

By comparing measurements for a single sector (i.e., same base station Tx antenna) with multiple neighbors (i.e., multiple STMs), bad antenna, and orientation-related issues could be isolated. A flowchart of an algorithm for implementing the present invention is set forth in FIG. 3.

Figure 3:
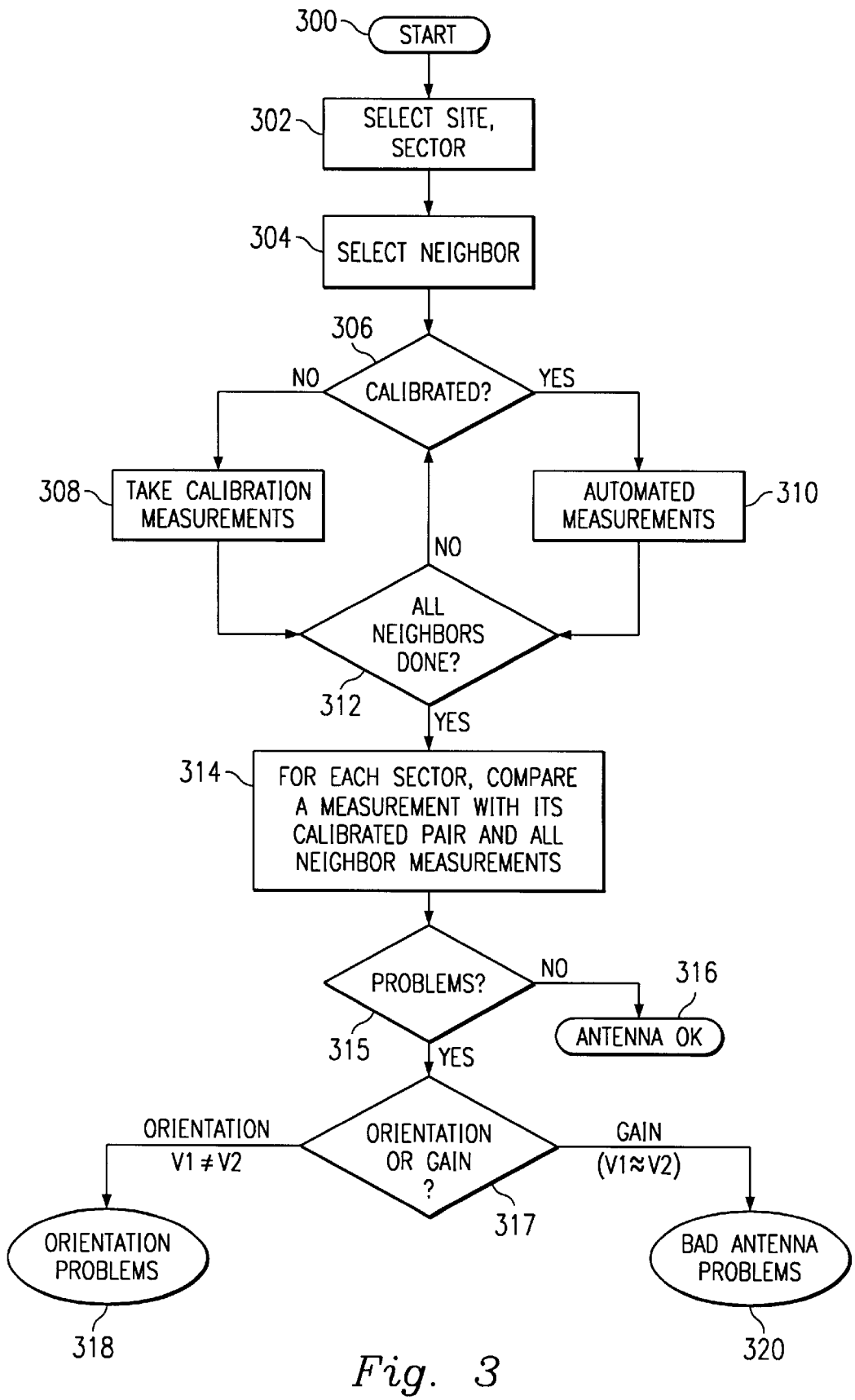
FIG. 3 is a flowchart of the operation of the present invention.

As shown in FIG. 3, execution begins at step 300. In step 302, a cell site and sector are to be tested are selected. In step 304, a neighbor cell site and sector for the cell site/sector selected in step 302 are selected. For example, referring to FIG. 2, if the cell site/sector selected in step 302 was cell site C1, sector S1, the neighbor cell site/sector selected in step 304 could be cell site C2, sector S6. Referring again to FIG. 3, in step 306, a determination is made whether the network has been calibrated. If not, execution proceeds to step 308 in which calibration measurements are taken. As previously indicated, this calibration will occur at the time of commissioning of the network, for new networks, or during a routine maintenance period for calibration purposes, for existing networks; otherwise, execution proceeds to step 310 in which automated measurements, as described above, are made.

Upon completion of step 308 or 310 execution proceeds to step 312, in which a determination is made whether all of the neighbors have been done. If not, execution returns to step 306. If in step 312 it is determined that all of the neighbors have been done, execution proceeds to step 314, in which, for each sector, the measurements are compared with its calibrated pair and all neighbor measurements. In step 315, a determination is made whether there are orientation problems or gain problems associated with the sector, in the manner described below. If not, execution proceeds to step 316; otherwise, execution proceeds to step 317, in which a determination as to the type of problems associated with the sector, in the manner described below. If in step 317 it is determined that there are orientation problems associated with the sector, execution proceeds to step 318. In contrast, if in step 317 it is determined that there are bad antenna (i.e., gain) problems associated with the sector, execution proceeds to step 320.

The determination as to whether there are orientation or bad antenna problems associated with the sector (step 315) is made as follows. First, for a given pair of sectors p and q, if $(Mp_{Ci,Nk}-Mq_{Ci,Nk})_{auto}$, where "auto" refers to the automatic measurements periodically made by the network and stored in Table 2 and Nk is a neighbor sector, is approximately equal to $(Mp_{Ci,Nk}-Mq_{Ci,Nk})_{calib}$, where "calib" refers to the calibration measurements stored in Table 1, then both sectors p and q have good antennas and no orientation problems.

Referring now to step 317, assuming cell site C2, sector S6, and another neighboring cell site/sector to cell site C1, sector S1, designated cell site C3, sector S8, have been determined to have neither antenna nor orientation problems, and cell site C2, sector S6, and cell site C3, sector S8 are first and second neighbors, respectively, of cell site C1, sector S1, designated "N1" and "N2", respectively, if:

$$V1=|(M1_{C1,N1}-M6_{C2,N2})_{calib}-(M1_{C1,N1}-M6_{C2,N2})_{auto}|$$

then if V1 is not approximately equal to zero, then cell site C1, sector S1, has either a bad antenna or orientation problems. A large value for V1 is an indication of a bad antenna (i.e., gain) problem.

Therefore, if:

$$V2=|(M1_{C1,N2}-M8_{C3,N2})_{calib}-(M1_{C1,N2}-M8_{C3,N2})_{auto}|$$

then if V1 is approximately equal to V2, the problem is one of a bad antenna (i.e., a gain problem) with respect to cell site C1, sector S1. Conversely, if V1 and V2 are very different, the problem is one of orientation with respect to cell site C1, sector S1.

As a result, the present invention presents a cost- and resource-effective method of identifying cell sites with bad and/or incorrectly oriented antennas. A major benefit will be realized by wireless network providers with inferior maintenance schedules that could lead to a substantial amount of antenna-related performance issues and associated costs.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A method of locating antenna problems in a radio frequency communications network including a plurality of cell sites, each of said cell sites comprising at least one sector having an antenna associated therewith and further having associated therewith a base station ("BS") comprising a site test mobile ("STM") connectable to said antenna, all of said base stations being interconnected by a base station controller ("BSC"), the method comprising:

selecting one of said cell sites;

selecting a sector of said selected one of said cell sites;

identifying a neighbor cell site and sector for said selected cell site and sector;

determining whether said communications network has been calibrated;

if said communications network has not been calibrated, calibrating said communications network;

if said communications network has been calibrated, automatically taking a plurality of measurements with respect to said selected cell site and sector and said neighbor cell site and sector, said measurements being stored in a second lookup table in a centrally located database of said communications network and updated in real time;

automatically comparing said plurality of measurements with calibration data for said selected cell site and sector and said neighbor cell site and sector, said calibration data being stored in a first lookup table in the centrally located database of said communications network; and automatically determining from said comparison whether said antenna suffers from at least one predefined problem.

2. The method of claim 1 further comprising, prior to said comparing, determining whether there are additional neighbor cell sites and sectors for said selected cell site and sector, and, if so, performing said taking a plurality of measurements for each of said additional neighbor cell sites and sectors.

3. The method of claim 1 further comprising determining from said comparing whether said antenna of said selected cell site and sector suffers from orientation problems.

4. The method of claim 1 further comprising determining from said comparing whether said antenna of said selected cell site and sector is defective.

5. The method of claim 1 wherein said database is located within said BSC.

6. The method of claim 1 wherein said taking a plurality of measurements is performed with the antennas of both said selected cell site and sector and said neighbor cell site and sector transmitting and receiving simultaneously.

7. The method of claim 1 wherein said taking a plurality of measurements is performed with said STM of said selected cell site connected to said antenna of said selected sector and said STM of said neighbor cell site connected to said antenna of said neighbor sector.

8. The method of claim 1 wherein said taking a plurality of measurements is performed by simultaneously transmitting a signal from said selected sector to said neighbor sector and from said neighbor sector to said selected sector.

9. A radio frequency communications network comprising:

a plurality of cell sites each comprising at least one sector each having an antenna associated therewith;

a base station ("BS") associated with each of said cell sites, each of said base stations including a site test mobile ("STM") electrically connectable to each said antenna of said base station; and a base station controller electrically connected to each said base station and comprising a database;

wherein periodically for each of said sectors of each of said cell sites, a plurality of measurements are taken between said cell site and sector and a neighbor cell site and sector thereof, said plurality of measurements being compared with calibration data for said cell site and said neighbor cell site stored in said database to determine whether the antenna of either said cell site and sector or said neighbor cell site and sector is defective or mis-oriented.

10. The network of claim 9 wherein said database includes a first lookup table containing said calibration data.

11. The network of claim 9 wherein aid database includes a second lookup table for storing said plurality of measurements.

12. The network of claim 9 wherein said plurality of measurements are taken with said STM of said cell site connected to said antenna of said sector and with said STM of said neighbor cell site connected to said antenna of said neighbor sector.

* * * * *